July 18, 1944.  J. A. SPRAGUE  2,353,897
SENSITIZED MATERIAL HOLDER OR CARRIER FOR PHOTOGRAPHIC
SYNCHRONIZER TESTING EQUIPMENT
Original Filed Sept. 30, 1942  5 Sheets-Sheet 1
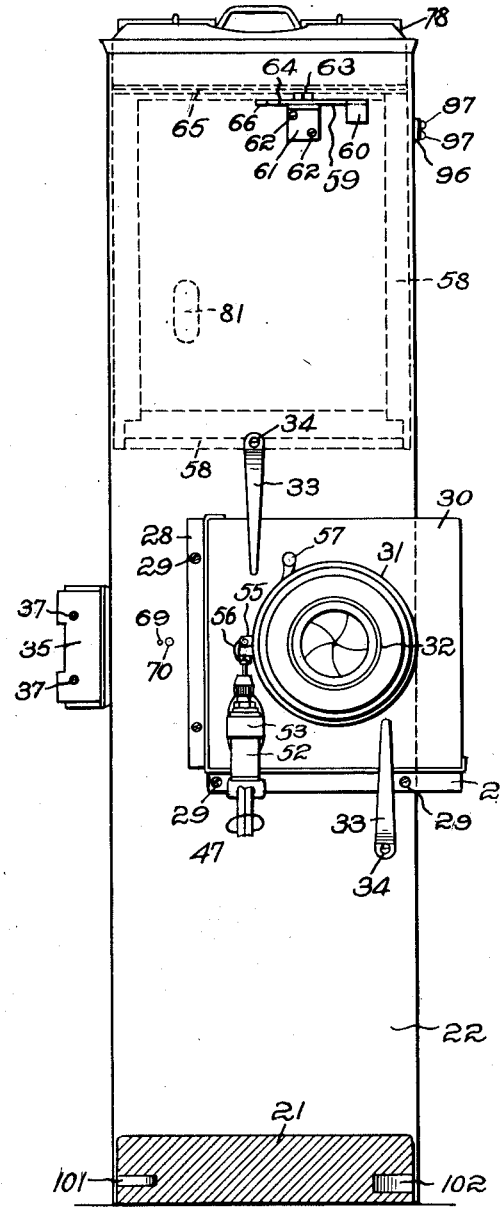
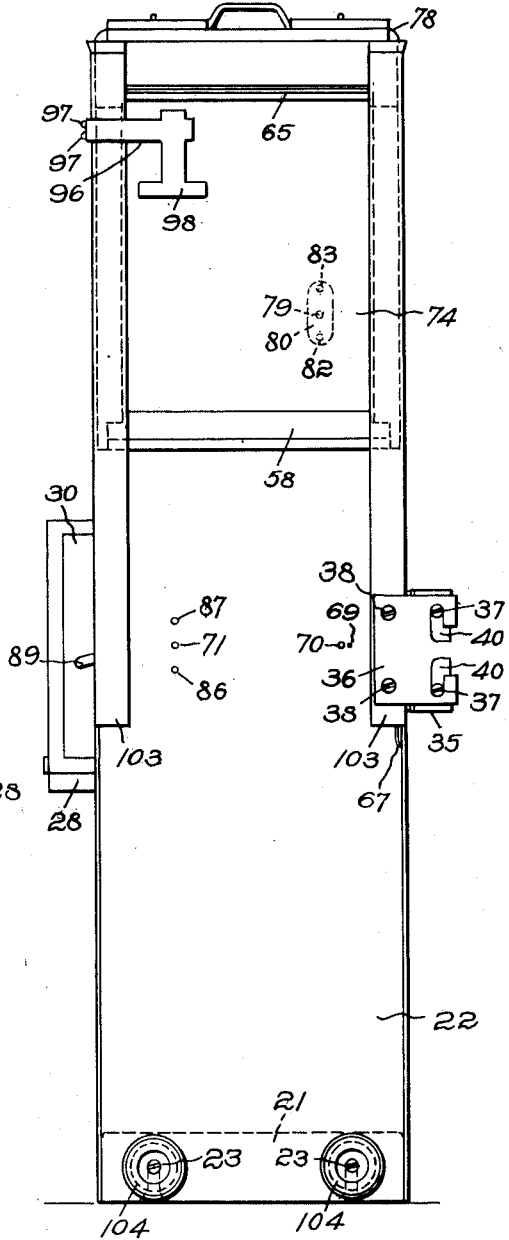
Inventor:
Joseph A. Sprague, July 18, 1944.    J. A. SPRAGUE    2,353,897
SENSITIZED MATERIAL HOLDER OR CARRIER FOR PHOTOGRAPHIC
SYNCHRONIZER TESTING EQUIPMENT
Original Filed Sept. 30, 1942    5 Sheets-Sheet 2
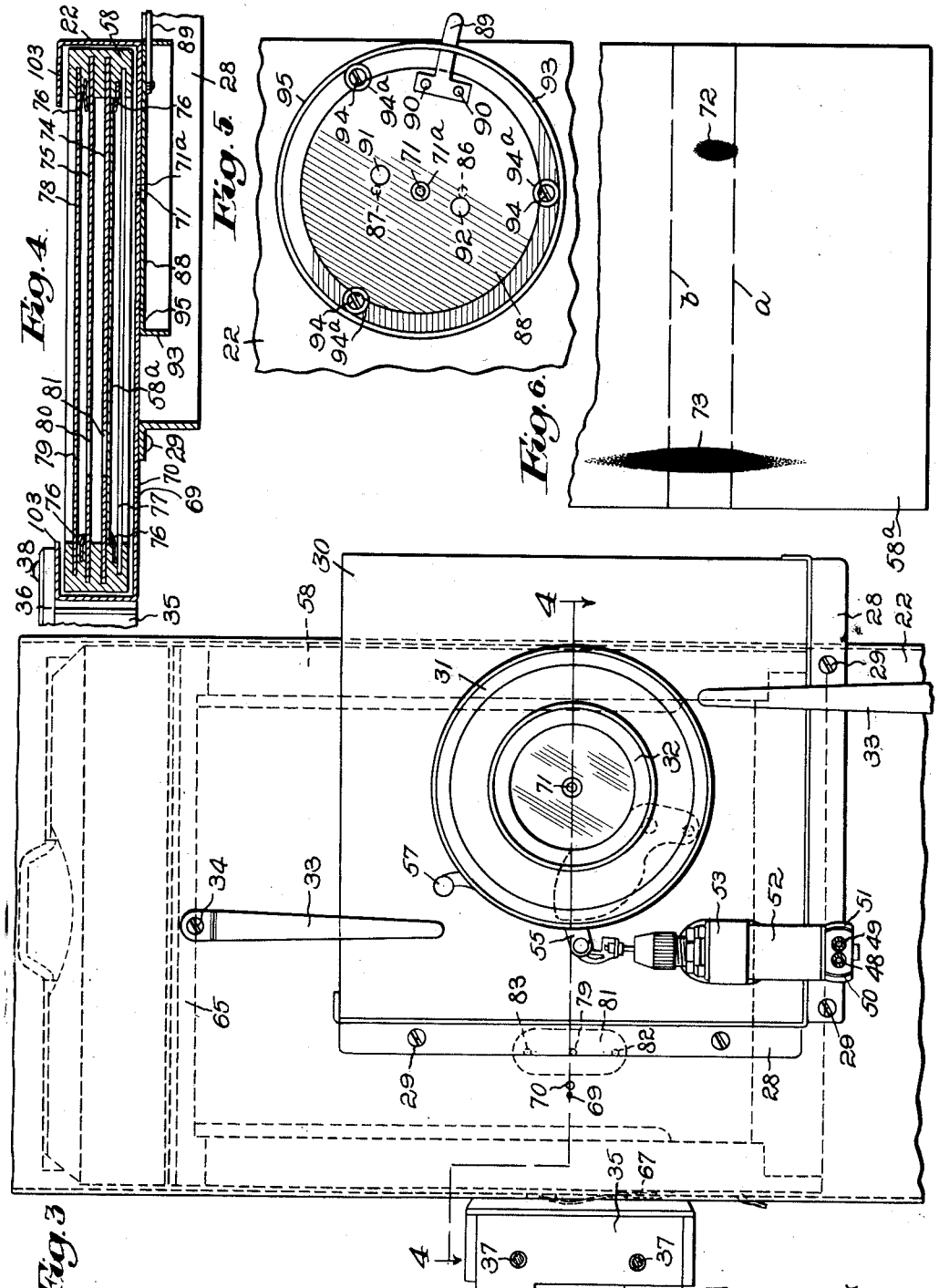
Inventor:
Joseph A. Sprague.

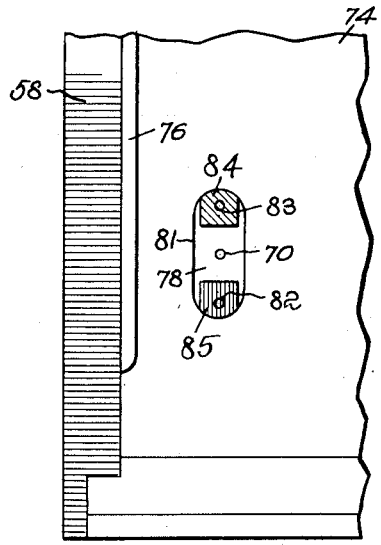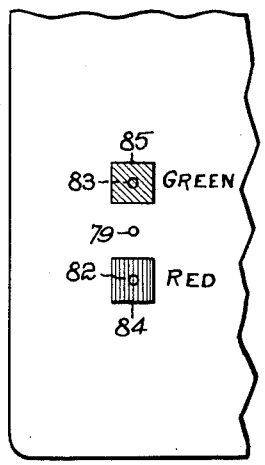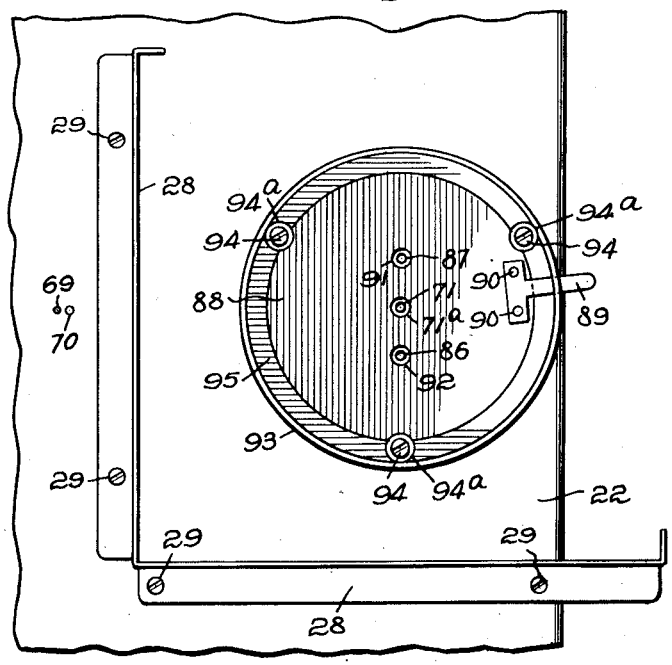

July 18, 1944.  J. A. SPRAGUE  2,353,897
SENSITIZED MATERIAL HOLDER OR CARRIER FOR PHOTOGRAPHIC
SYNCHRONIZER TESTING EQUIPMENT
Original Filed Sept. 30, 1942    5 Sheets-Sheet 4

Inventor:
Joseph A. Sprague,
by Emery, Booth, Townsend, Miller and Lumpkin
Attys

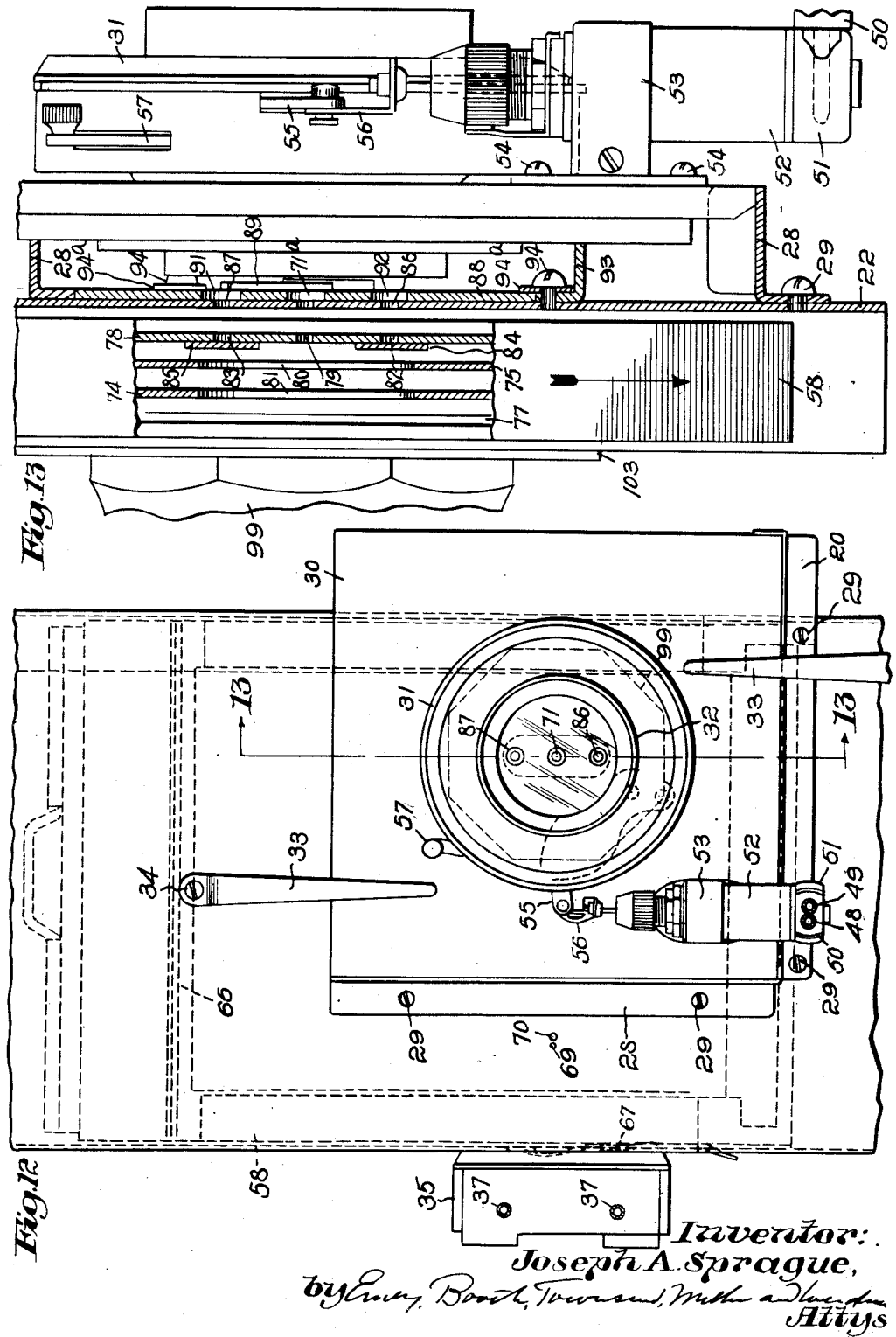

Patented July 18, 1944

2,353,897

UNITED STATES PATENT OFFICE 2,353,897

SENSITIZED MATERIAL HOLDER OR CARRIER FOR PHOTOGRAPHIC SYNCHRONIZER TESTING EQUIPMENT

Joseph A. Sprague, Honeoye Falls, N. Y., assignor to The Folmer Graflex Corporation, Rochester, N. Y., a corporation of Delaware Original application September 30, 1942, Serial No. 460,313. Divided and this application September 2, 1943, Serial No. 500,910

12 Claims. (Cl. 88—14)

This application is a division of my co-pending application Ser. No. 460,313, filed September 30, 1942, for Photographic synchronizer testing equipment.

This invention relates to a sensitized material holder or carrier for a photographic synchronizer testing equipment.

In order that the principle of the invention may be readily understood, I have disclosed a single embodiment of my invention in the accompanying drawings, wherein Fig. 1 is a front elevation of the synchronizer tester claimed in said application, in condition for making a record test, with the horizontal member in transverse section, showing the shutter and lens board with the magnetic tripper attached thereto, the sensitized material holder or carrier herein claimed being shown in dotted lines;

Fig. 2 is a rear elevation of Fig. 1, showing the position of the said sensitized material holder or carrier prior to making a record test, the mechanism being in condition for making the same;

Fig. 3 is a view similar to Fig. 1, but on an enlarged scale, showing the sensitized material holder or carrier in dotted lines in position for shutter operation;

Fig. 4 is a partial horizontal section through Fig. 3 on the line 4—4 thereof, showing the parts of the sensitized material holder or carrier as positioned when a record test is being made;

Fig. 5 is a fragmentary front elevation of the light valve or gate used when selecting the type of test to be made, i. e. a visual test or a record test, the light valve being in position for making a record test;

Fig. 6 is a fragmentary view of a developed photographic sheet or chart showing both the trace produced by the photoflash lamp and the trace produced through the shutter;

Fig. 7 is a fragmentary, rear view detail of the sensitized material holder or carrier, showing the several openings used in checking the shutter by the visual test;

Fig. 8 is a fragmentary view of one of the dark slides used in said holder or carrier when making visual tests, and showing the position of the filters thereon;

Fig. 9 is a fragmentary view of the synchronizer tester vertical frame, showing the means for supporting the lens board, the gate or light valve being set in condition for making a visual test;

Fig. 12 is a view similar to Fig. 3, but showing the mechanism in condition for making a visual test, the shutter being in the open condition so as more clearly to show the structure thereof; and Fig. 13 is a section through Fig. 10, showing the position of the dark slide of said holder or carrier when the parts are in position for making a visual test.

When a flash gun or photoflash equipment is installed on a camera, it is necessary to have some means for checking the synchronization of the peak of the flash with the opening of the photographic shutter. It is also necessary to have some such equipment for checking the synchronization after any of the parts have been removed for repairs or for any other reason. There have been developed for use in well-equipped laboratories, very elaborate means for checking such equipments, but there has long been need for a simple equipment that could be used in a dark room in the field and that would give a quick visual check upon the performance of the apparatus, and if necessary make a photographic record of the performance of the camera shutter when equipped with a flash synchronizing mechanism. My invention herein claimed relates to a sensitized material holder or carrier to be used in the herein disclosed equipment that does both things in a highly satisfactory manner.

The object of my invention is to provide a simple sensitized material holder that can be loaded with a sheet of sensitized material for providing a permanent photographic record.

Figure 11:
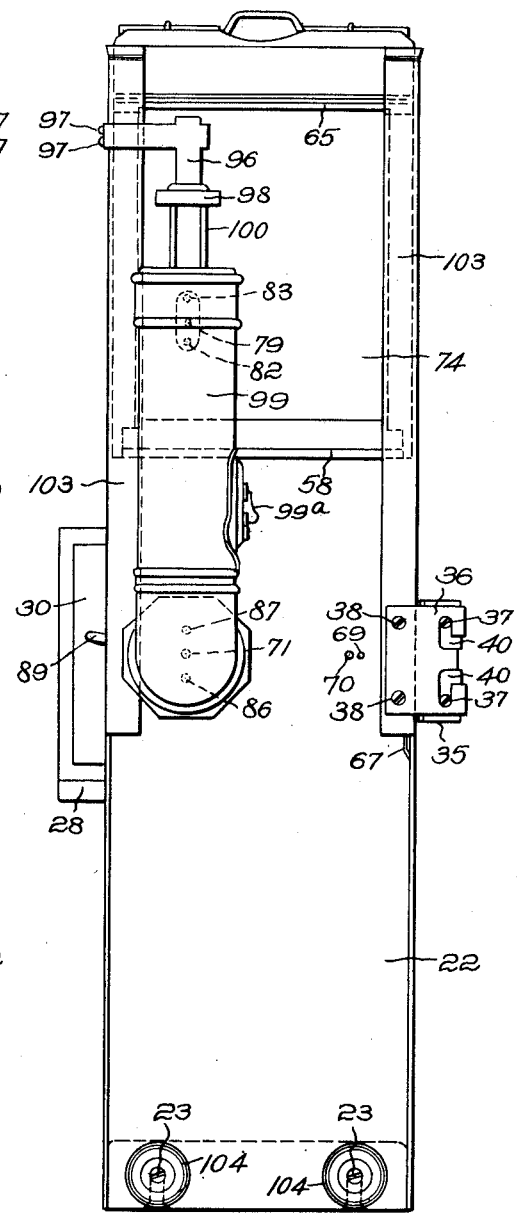
Fig. 11 is a view similar to Fig. 2, but showing the flashlamp in the position wherein the synchronizer testing equipment is in condition for making a visual test.

Referring first to Figs. 1 and 2, the structure constituting the testing equipment using my herein claimed invention is mounted on a table or other suitable support, upon which is positioned in a face-to-face relation therewith (being secured thereto if desired) a base supporting member 21, preferably of wood, shown as rectangular in cross section, and to which is attached a vertical support member 22 preferably of sheet metal and attached to the said base supporting member 21 by screws 23, 23, shown in Figs. 2 and 11.

As indicating the use of the disclosed embodiment of the testing equipment, I have shown as an example of a synchronizer that may be tested in the testing equipment, the synchronizer that is disclosed in the patent to Oscar Steiner, No. 2,329,011, dated September 7, 1943, but my equipment is intended for use in testing synchronizers differing widely in construction. There is provided with the equipment a suitable battery case with flashlamp and reflector.

A lens board receiver 28 is attached to the vertical support member 22 by screws 29, 29, being most clearly shown in Fig. 3. As there indicated, and also in Figs. 1, 2, etc., it has fitted thereinto a lens board 30 whereon is mounted a shutter 31 having a lens 32, such lens board 30 being held in position by retaining springs 33, 33 pivoted to the vertical support member 22 by screws 34, 34. Also mounted upon the said vertical support member 22 is an electrical switch 35 held in position by an insulating strip 36 to which the switch 35 is secured by screws 37, 37, the said insulating strip 36 being itself held to the vertical support member 22 by screws 38, 38, shown in Figs. 2 and 11. The said switch 35 is provided with the usual contact screws, to which are attached a pair of bus-bars 40, 40 terminating under the heads of screws 37, 37, which pass through the body of the switch 35 and serve as contacts to which are attached suitable wires including a cable 47 consisting of wires 48, 49, provided with an electrical plug 50 fitted into a to-and-fro or axially movable element 51 of an electromagnetic tripper 52 held to the lens board 30 by a tripper bracket 53 itself attached to said lens board by screws 54, 54, all as best shown in Figs. 1, 3, 12 and 13, collectively.

Referring particularly to Figs. 1, 2 and 4, the said electromagnetic tripper 52 is in mechanical connection with a shutter release arm 55 by means of a connecting link 56 or in any other suitable or desired manner. The shutter 31 is provided with the usual set lever 57. The vertical support member 22 is desirably of a channel formation, as shown most clearly in Fig. 4, and it is of a shape and construction to receive the sensitized material holder or carrier 58 of my present invention (shown in dotted lines in Fig. 1 and in solid lines in Fig. 2) which contains sensitized material 58a. Hereinafter the part 58 is referred to as the holder, merely for convenience of description.

The structure and proportions of the channel formation of the vertical support member 22 with respect to the sensitized material holder 58 are such that the said holder 58 will drop freely in a vertical direction when released by the means now to be described, constituting a part of the testing equipment. In order to maintain the said holder 58 in its initial position before the dropping thereof, I provide any suitable means, but for the purpose I have herein represented latching means consisting of a lever 59 (shown in Figs. 1 and 10) having a release pad 60 for manual manipulation, said lever being secured to the vertical support member 22 in a horizontal position on a bracket 61, itself held to the vertical support member 22 by means of screws 62, 62 (Fig. 1). The said lever 59 is itself attached to the bracket 61 by a shoulder screw 63, being free to pivot thereon, and is provided with a laterally extending finger (not shown). The purpose of the said finger is to engage a ledge 65 of the sensitized material holder 58 (best shown in Figs. 2, 10 and 11), which is formed by providing an opening in the said holder 58. The vertical support member 22 is provided with a suitable opening 66 (Fig. 1) through which passes the said laterally extending finger.

When the sensitized material holder 58 is engaged by the said laterally extending finger of lever 59, the said holder is held in the position indicated in Figs. 1 and 2. When, however, the pad 60 of the lever 59 is pressed by the operator in a rearward direction so as to withdraw the said finger of lever 59 from the ledge 65 of the holder 58, the latter is permitted to drop vertically.

The switch 35 (best shown in Figs. 1 and 3) is provided with an operating arm 67. The said switch is desirably a standard switch obtained on the open market and is preferably of the type known as Microswitch and the operating arm 67 is a part of the said switch as purchased.

The vertical support member 22 is provided with a suitable cut-out or opening to allow the arm 67 to extend through one of the side walls of the vertical support member 22, so that the switch operating arm 67 extends into the path of the sensitized material holder 58 when the latter is permitted to drop in the vertical support member 22. This action is best indicated in Fig. 3, wherein the switch operating arm 67 is shown depressed as the sensitized material holder 58 passes said operating arm. When the said sensitized holder 58 reaches the position shown in Fig. 3, the said switch operating arm 67 is moved by the said holder 58 in the left hand direction viewing said figure, thus operating the switch 35 and closing the contacts thereof. This movement completes the circuit, thus causing the flash-lamp to be ignited and the electromagnetic tripper 52 to be operated, thereby operating the camera shutter 31 just as such shutter would have been operated had the switch of the battery case been operated in the usual manner in taking a photograph by the camera, instead of by operating the switch 35 of the testing equipment.

The sensitized material holder 58 is a standard film holder with, however, certain modifications to be presently described. For the purpose of making a record test by my equipment, no modification of the film holder 58 from a standard construction is necessary.

The operation of the structure thus far described is as follows:

The sensitized material holder 58 is loaded with a sensitized sheet of paper or film and is placed in the channel of the vertical support member 22, being retained by the latch member or lever 59 until it is desired to make the test. When a test is to be made, the dark slide of the holder 58 having first been withdrawn, the said holder is released by the latch member or lever 59 and drops by gravity, and upon reaching the switch operating arm 67 the switch 35 is operated, thereby completing the circuit through cable 47 to the battery case, the flash-lamp and magnetic tripper 52, thus operating the shutter 31.

In order to ascertain the instant of time when the shutter 31 is caused to open with relation to the flash of the photoflash lamp, I have provided two openings 69, 70, in the vertical support member 22, as shown in Figs. 1, 2, 3, etc. The opening 69 is of smaller diameter than the opening 70 so as to allow a reduced amount of light to pass therethrough, thereby providing an opportunity better to record the light intensity, since, as is well known, the more light passing through the holes 69, 70, the denser will be the exposure.

As the sensitized material holder 58 passes the switch operating arm 67, as previously described, and thus causes the flashlamp to be ignited and the shutter 31 to be operated, the sensitized material 58a that is in the said holder 58 will be behind the holes 69, 70, and said holes 69, 70 and the shutter opening of the shutter 31 all receive light from the flashlamp. Therefore, an unexposed area of the sensitized material 58a will appear behind the opening 71, provided in the front face of the vertical support member 22, as shown in Fig. 2, and which opening 71, as there shown, is aligned with the center of the opening of the shutter 31, as indicated in Fig. 3, said sensitized material being also behind the holes 69, 70, previously referred to. That is, said opening 71 is in what may be termed line-of-vision register with the center of the opening of the shutter. Therefore, light is admitted to the sensitized material 58a in the holder 58. Inasmuch as the holes 69, 70 are always open, the sensitized material 58a will be exposed during all of the flash of the photoflash lamp, but light is excluded from the hole 71 by the shutter 31 at all times excepting when the shutter aperture is open, it being noted that the shutter aperture is controlled by the electromagnetic tripper 52, as previously explained.

Therefore, if a photoflash lamp is placed in the socket of the battery case and the holder 58 of suitable construction is loaded with sensitized material 58a, and is placed in the vertical support member 22 and then allowed to drop by manual manipulation of the latch member or lever, a circuit is completed to the flashlamp and the electromagnetic tripper 52, as already explained. Consequently a flash will take place and will be recorded for the full length of such flash through the holes 69 and 70, and during the time that the shutter is open, light will pass through the hole 71 to the sensitized material 58a and will also be recorded.

Upon development of the sensitized material 58a, the exposed areas will appear as clearly indicated in the chart Fig. 6, wherein the area behind the shutter opening 71 will appear as indicated at 72, and the exposed area behind the openings 69 and 70 will appear as indicated at 73. When the exposures do appear as in the chart Fig. 6, the shutter is in proper synchronous relation, that is, it is simultaneous in functioning with the flashlamp, as indicated at the exposure area 73 (Fig. 6).

It will be noted that the exposed area indicated at 73 in the chart Fig. 6 builds up from no exposure to a very dense exposure, and then drops down to no exposure. It is desirable to have the opening of the shutter 31 take place during that area of greatest illumination (that is, to have it occur between the broken lines a and b of the chart Fig. 6). If, however, the exposed area 72 appeared below the broken line a or above the broken line b of the chart Fig. 6, the shutter 31 would be out of synchronous relation with the flashlamp (i. e. would not be functioning simultaneously therewith). If the said exposed area 72 appeared below the line a, the shutter 31 would be operated too soon. If said exposed area 72 appeared above the line b of the chart Fig. 6, the shutter 31 would be operated too late. The lines a and b of the chart Fig. 6 therefore represent the desirable area in which the shutter 31 should be operated. In the instance illustrated in the chart Fig. 6, the shutter 31 was operated within the said desirable area but slightly early in time, being nearer the dotted line a. This is the preferred adjustment because with use the battery of the synchronizer will become deteriorated and the synchronizer will consequently operate slightly more slowly. Therefore, as the battery voltage drops, the exposed area 72 would move slightly upward with respect to the chart Fig. 6 if a further test were to be made.

The speed at which the sensitized material holder 58 travels downward when released is not critical, but the position along the vertical support member 22 of the switch 35 with its operating arm 67 should be such that the flashlamp will be ignited during the time that the sensitized material 58a in the holder 58 is in position behind the holes 69, 70 and 71. After such position for the location of the switch 35 along the support member 22 has once been located either by mathematical determination or by experiment, no further adjustment of parts is required for making a record test by the testing equipment herein disclosed. Since the entire duration of the flash is recorded, and since the holes 69, 70 in the support member 22 are in horizontal alignment with the hole 71, it is always an easy matter to plot the exposed area 72 against the exposed area 73, and since the entire length of the exposed area 73 never is greater than twenty-five per cent of the length of the piece of sensitized material 58a, a considerable latitude is allowable in the adjustment of the position of the switch 35. Nevertheless for best all round performance I have found that the proportions represented in the drawings of this application are the correct proportions of the vertical support member 22 with the illustrated position of the switch 35 being ideal for the testing of all flashlamps of known manufacture.

The sensitized material holder 58 is of the usual construction of sensitized photographic film holders, but with certain modifications when used for visual tests. The structure of said holder 58 is most clearly evident from Fig. 4, wherein it is represented as provided with separating plates 74, 75, film retaining strips 76, 76, grooves 77, 77 for receiving dark slides and the dark slides 78, 78, only one of which is shown, the other having been removed to permit exposure of sensitized material 58a in the manner previously described.

When the testing equipment herein disclosed is used for making the visual test, the holder 58 is not loaded with sensitized material, but its position is reversed as it is placed in the vertical support member 22, so that an opening 79 of the dark slide 78 of the holder (shown in Fig. 4) is in alignment with the hole 71 of the vertical support member 22 (that is, when the holder 58 is dropped, said opening 79 comes in line-of-vision register with the hole 71 of the vertical support member 22), and the openings 80, 81 of the separating plates 75, 74 respectively (shown in Fig. 4) are in horizontal alignment with the opening 79 in dark slide 78, and are of sufficient length to uncover holes 82 and 83, also provided in the dark slide 78. (This structure is best shown in the sectional view Fig. 13.) The said dark slide 78 is provided with the said three openings 79, 82, 83. The opening 82 is provided with a red filter, indicated at 84, and the opening 83 is provided with a green filter, as indicated at 85. I am not limited to the provision of filters of the stated colors, as any two suitably contrasting colors may be employed.

When the dark slide 78 is in position for making a visual test, the holder parts will appear as shown in Fig. 13, and when they are in position for making a record test, the holder parts will be positioned as shown in Fig. 4.

For making a visual test, two additional holes are provided in the vertical support member 22, being indicated in Fig. 5 by dotted lines at 86, 87, and in full lines in Fig. 9, and in section in Fig. 13. When making a record test, it is necessary that the holes 86, 87 are covered or capped. For this purpose, I have provided a light valve consisting of a disk 88, best shown in Figs. 4, 5 and 9 as mounted on the vertical support member 22, and as having a handle 89 attached thereto by rivets 90, 90. The said light valve or disk 88 is provided with openings 91 and 92 for alignment with the openings 87 and 86 respectively. When the said light valve or disk 88 is in position for making a visual test, it will be precisely as indicated in Fig. 9. The said light valve or disk 88 is held in place by a ring 93 concentric therewith and secured to the vertical support member 22 by large headed screws 94, 94. The said concentrically arranged ring 93 is provided with a flange 95 having an opening into which is fitted the said light valve or disk 88. The screws 94, 94 and washers 94a are provided to hold the light valve or disk 88 in position in the ring 93 and against the vertical support member 22.

When the said light valve or disk 88 is turned in a clockwise direction viewing Figs. 5 and 9, the handle 89 travels in a slot provided therefor in the ring 93. The openings 91 and 92 will thus be moved out of alignment with the openings 86, 87, and thereby all light is prevented from passing through the holes 86, 87, and reaching the sensitized material 58a in the holder 58. The light valve or disk 88 is in this position when making a record test, and when its handle 89 is moved in a contraclockwise direction viewing Figs. 5 and 9, the hole 91 of the light valve or disk 88 will be in alignment (that is, in line-of-vision register) with the hole 87. The parts will then be in the position shown in Fig. 9, which is the position of the parts when making a visual test. Inasmuch as the openings 80 and 81 of the separating plates 75, 74 will be in alignment with the hole 71 and the holes 86, 87, light can pass through the sensitized material holder 58 and through the vertical support member 22 and the disk 88 when the said sensitized material holder 58 reaches the position shown in Fig. 13, and also through the shutter 31 when such shutter is open.

In order to provide a fixed source of illumination for use when making a visual test, the vertical support member 22 has attached thereto a supplemental support member 96 by means of rivets 97, 97, best shown in Fig. 11, and also in Figs. 1 and 2, said support member 96 having a suitable formation 98 to which is hung, as shown in Fig. 11 a flashlamp 99 by means of a bale 100. The flashlamp 99 is of the structure shown in Fig. 11, and is the standard flashlamp as carried by armed forces of the United States, said flashlamp functioning in the usual way. It is of the right angle type and is so positioned that the holes 86, 87 and 71 will be illuminated when the battery case of said flashlamp 99 is in place and the switch 99a has been operated.

For making a visual test, the cable 47 is suitably plugged to the electromagnetic tripper 52 and to the battery case, and the switch 35 is connected to the battery case. When the sensitized material holder 58 is released in the manner previously described, the shutter 31 will be operated as previously set forth.

Figure 10:
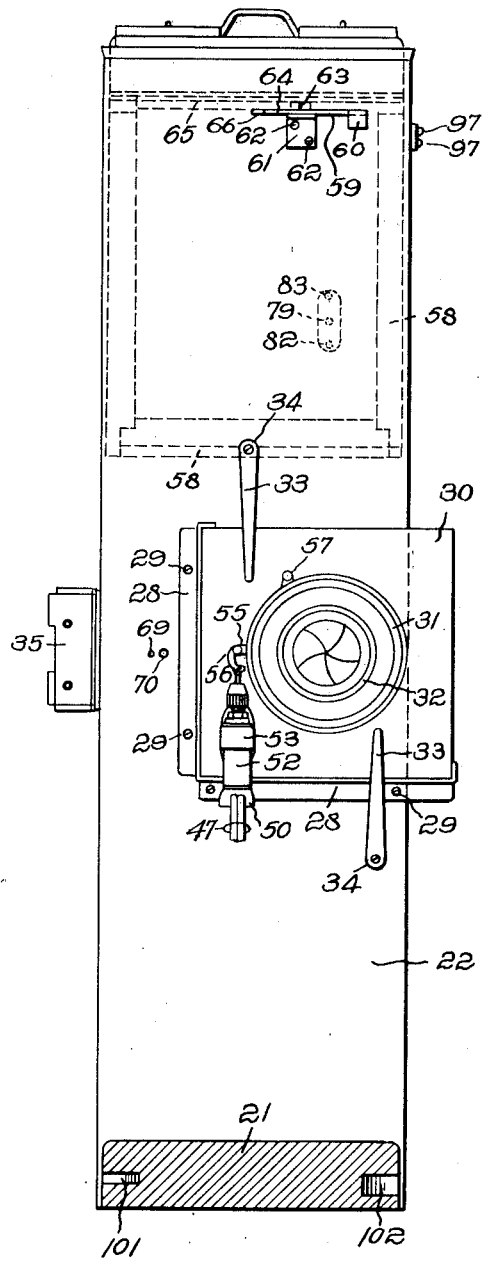
Fig. 10 is a view similar to Fig. 1, but showing the sensitized material holder or carrier in dotted lines, in position for making a visual test.

In order to make a visual test, the light valve or disk 88 is set in the position shown in Fig. 9 and the sensitized material holder 58 is placed in the position shown in Fig. 10. When such holder 58 is placed in the vertical support member 22, in the position indicated in Figs. 10 and 11, and is allowed to drop by releasing the latch member or lever 59, the electromagnetic tripper 52 will be operated when the said holder 58 reaches the switch operating arm 67, so completing the circuit to the battery, and to the electromagnetic tripper 52 through the cable 47, the flashlamp 99 having previously been illuminated manually in the usual manner. The shutter 31 will be caused to open by the completion of the circuit as stated, and the operator will see the light from the flashlight 99 projected through the openings 86, 87 if the shutter is in proper synchronous relation with the flashlamp.

If light is visible only through holes 87 and 71, the synchronizer has been adjusted to function too early for the best results, and if light is seen only through holes 71 and 86, the synchronizer has been adjusted to function too late for the best results. The synchronizer tripper should then be adjusted so that light will be visible through all three openings 87, 71 and 86.

The filters 84, 85 are provided in order that the operator may determine through what holes the light passes. When a start is made on adjusting the synchronizer by beginning the visible test now being described, it is very likely that the adjustment of the synchronizer will be found to be far from correct. Therefore, at the beginning of the test of the synchronizer, it is probable or possible that the operator may see light through one hole only, and if light that he sees is green, he will know that the position of the synchronizer has been improperly set for too late functioning. If, on the contrary, the operator sees only a red light, he will know that the positioning of the synchronizer is too early. If he sees a green light and a white light, he will know that the positioning of the synchronizer is close to the correct position, but is still too late, and if he sees a white light and a red light, he will know that the positioning of the synchronizer is early but very close. All that is necessary is for the operator to make adjustment in the proper direction so that he will see both a red light and a green light, and of course when he sees them, he will also see a white light. He will then know that the synchronizer being tested is in a position of correct adjustment for proper functioning.

When using the visual synchronizer test, it is important that the switch 35 be in proper position with respect to the sensitized material holder 58 when contact is made at the switch 35, so that there will be a proper time delay between the time of contact and that instant when the openings 83, 82 of the said sensitized material holder 58 are in alignment (that is, in line-of-vision register) with the openings 87, 86 of the vertical support member 22. This can be readily checked when using the synchronizer test as a recording test. It is only necessary to adjust the synchronizer switch 35 and its operating arm 67 in a vertical direction, so that the flash takes place at a proper instant of time with respect to the opening 71. After this adjustment has once been made for a flash bulb of given manufacture (that is to say, for a flash bulb known to have a certain time delay, such, for example, as twenty milliseconds), all tests can be then made without further adjustments so long as flashlamps having that time delay are used with the synchronizer that is being tested.

The synchronizer testing equipment herein disclosed is first adjusted by making a record exposure and the position of the switch 35 is adjusted in a vertical direction along one side of the vertical support member 22, so that the flash as indicated by the exposed area 72 is located between the dotted lines a and b of the chart Fig. 6. The position of the switch 35 with respect to the position of the sensitized material holder 58 at the time contact is made will then be correct for making a visual reading when testing lamps known to have the same time lag or delay. If it is desired to test a lamp having a known different time lag or delay, the switch 35 must be moved along and readjusted on the vertical support member 22 until the exposed area 72 will be between the lines a and b, of the chart Fig. 6. If the flashlamp being tested is of a different characteristic than the one illustrated in the chart Fig. 6, by which is meant a flashlamp having a longer duration of flash or a shorter duration of flash, the space between the dotted lines a and b must be increased or decreased accordingly, and of course it will be necessary to adjust the position of the switch 35, so that the flash, as indicated by the exposed area 72 will be between the repositioned two lines a and b. Since the holes 69, 70 and 71 on the vertical support member 22, through which light passes, are in horizontal alignment, when the shutter tripper is once adjusted for making a record test, the exposed areas 72 and 73 will always be as indicated in the chart Fig. 6.

The synchronizer testing equipment herein disclosed is desirably of such construction that it can readily be folded for transportation or storage. To that end the base member 21 is provided with two elongated slots 101 and 102 along the opposite lateral edges thereof, as indicated in Fig. 1. The said vertical support member 22 may be detached from the base member 21 by loosening screws 23, 23, and the vertical member 22 can be slid into the said parallel slots 101, 102, after having been removed from the base member 21. Attached to the screws 23, 23 are rubber bumpers 104, 104 to absorb shock when the sensitized material holder 58 reaches the limit of its downward travel following its release by movement of the latching means or lever 59.

A resume of the operation of the disclosed synchronizer testing equipment is as follows.

The vertical support member 22 is first withdrawn from the parallel slots 101, 102 of the base member 21 and secured in the position shown in Fig. 1. A flashlamp battery case is then mounted in suitable position on the base member 21. The lens board 30 having mounted thereon a shutter 31 and lens 32 is then placed in position in the lens board carrier 28 and is securely held thereto by means of the springs 33, 33. The necessary plugs of the circuit wiring are inserted.

The sensitized material holder 58 is loaded with a sheet of sensitized material 58a, it being understood that the entire apparatus is in a photographic dark room in the field or other place of use. A flashlamp or bulb is placed in the socket of the battery case, the shutter 31 is set for the desired shutter speed, and the sensitized material holder 58 is allowed to drop by the releasing action of the lever 59 constituting the latching means. When the said sensitized material holder 58 reaches the contact spring 67, a circuit is completed, thus causing the flashlamp to be ignited and the electromagnetic tripper 52 to be operated in the manner previously described. The shutter 31 will then be caused to be opened and the sensitized material 58a will be in position behind the holes 69, 70, 71 in the vertical support member 22, thus exposing the sensitized material 58a and upon development thereof it will appear as shown in the chart Fig. 6 if the tripper is properly adjusted.

If the exposed area 72 is below the line a of the chart Fig. 6, it will be necessary to adjust the electromagnetic tripper 52 so that the said shutter 31 will be operated relatively later than when the described test was made. If the exposed area is above the dotted line b of the chart Fig. 6, the electromagnetic tripper 52 must be adjusted to cause the flash to occur relatively earlier than in the described test. When a proper adjustment has been found and the sensitized material 58a is developed, the latter will appear as shown in the chart Fig. 6, where the exposed area 72 will be located between the dotted lines a and b of the chart Fig. 6.

In order to make a visual test, the sensitized material holder 58 is reversed in position, but is held from dropping by the latch member or lever 59, the flashlamp 99 is hooked onto the flashlamp support 96, and the switch 99a is operated in usual manner to cause the flashlamp 99 to be illuminated. Said sensitized material holder 58 is then released by pressing upon the pad 60 of the latch member or lever 59, whereupon said holder 58 drops. As the shutter 31 is operated in the manner previously described, one or more of the holes 87, 71 and 86 will be illuminated and the electromagnetic tripper 52 is adjusted to cause the said shutter to be operated either later or earlier depending on which holes are illuminated, until an adjustment is reached where all three holes 87, 71 and 86 are illuminated as described. The operator will then see a green light and a red light with a white light between them.

The battery case is usually laid flatwise on the horizontal base member 21 when making a visual test rather than positioning it upright in the hole or other support provided therefor, so as thus to provide a clear path for the operator to view the holes 87, 71 and 86 through the lens 32.

The synchronizer tester equipment herein disclosed can be used both for making recorded tests and visual tests. This is very desirable because at times the adjustment is made by someone other than the operator of the camera, and it is very desirable that the operator of the camera have at his disposal the record of the performance of his synchronizer equipment.

It is, however, necessary to use at least one flashlamp when making the record test. The visual test method is used for quick checking upon the performance of the synchronizer equipment, and it is also used when a record test is to be made. The usual procedure is to adjust the synchronizer as accurately as possible by the visual method and then to make a record test. In this way it is necessary to use only one flashlamp.

Actually, in the experimental work and in the designing and building and testing of the equipment herein disclosed, it was necessary to flash a great many lamps in order accurately to ascertain the correct position for the switch 35. After such correct position for the switch 35 has once been found, additional apparatus can be manufactured from fixed measurements, since the velocity of the sensitized material holder 58 remains constant enough for all practical purposes. Therefore, it is never necessary for the operator of the disclosed equipment to use more than one flash bulb in adjusting any one synchronizer, inasmuch as he first proceeds to make his adjustment by the visual method, and when all three holes (that is, the red, the white and the green holes) are seen when making the visual test, the record test which follows will be that shown in the chart Fig. 6, and it is only necessary to make the recorded test when the record of that test is to be used for future reference.

I am aware that heretofore there has been provided an equipment having visual testing means for photoflash synchronizers, but so far as I am aware I am the first to provide a testing equipment for photographic flashlight synchronizers by which a visual test can be made and by which a record test can also be made, and so far as I am aware a sensitized material holder or carrier has never been used in the manner and for the purpose herein disclosed.

Having thus described one illustrative embodiment of the invention herein claimed, it is to be understood that although specific terms are employed, they are used in a generic and descriptive sense and not for purposes of limitation, the scope of the invention being set forth in the following claims.

I claim:

1. As a new article of manufacture for use in a testing equipment for photographic flashlight synchronization, a sensitized material holder adapted to be temporarily supported in said equipment and then dropped past light-admission openings in an upright wall of said equipment, said holder having at one side means for receiving sensitized material and at such side having means for receiving a dark slide for covering such sensitized material when in the holder and having at the other side a dark slide having therein at least two adjacent through-openings in substantially vertical alignment, said openings having different light transmitting characteristics, whereby to determine through which of said dark slide openings light is transmitted in making a visual test, while said holder is dropping past a light-admission opening of said equipment and the open shutter, said holder also having a separating plate provided with an opening therein which is elongated sufficiently to expose both of the said openings in the dark slide, and which is in alignment with said openings in the dark slide.

2. As a new article of manufacture for use in a testing equipment for photographic flashlight synchronization, a sensitized material holder adapted to be temporarily supported in said equipment and then dropped past light-admission openings in an upright wall of said equipment, said holder having means at one side to support therein a sheet of sensitized material, and having at the other side a dark slide 78 provided with a small opening 79 therein, and having two separating plates 75, 74 respectively provided with small openings 80, 81, both in alignment with the said opening 79 of the dark slide 78, the said dark slide also having small openings 82, 83, in vertical alignment with said opening 79 in said dark slide and close thereto, said openings 80, 81 being large enough to cover all of said openings 79, 82, 83 of the dark slide, said slide openings having different light-transmitting characteristics, whereby to determine through which of said slide openings light is transmitted in making a visual test, whereby a record test can be made when a sheet of sensitized material is positioned in the holder at the first mentioned side and said holder is dropped in said equipment, and whereby a visual test can be made without the use of a sheet of sensitized material in the holder, by reversing, side for side, the position of the holder as supported for dropping in the equipment, with respect to the position of said holder in the equipment when supported therein for a record test.

3. As a new article of manufacture for use in a testing equipment for photographic flashlight synchronization, a sensitized material holder adapted to be temporarily supported in said equipment and then dropped past light-admission openings in an upright wall of said equipment and past a supported shutter, said holder having at one side means for receiving sensitized material and at such side having means for receiving a dark slide for covering such sensitized material when in the holder and having at the other side a dark slide having therein at least two adjacent through-openings in substantially vertical alignment and having different light transmitting characteristics, said holder being of a shape permitting it to be reversed side for side in said equipment for a record test and a visual test respectively, so that a record test can be made with a sheet of sensitized material positioned in the holder at the first-mentioned side, and a visual test can be made without a sheet of sensitized material in the holder, but with the holder reversed, side for side, in said equipment, from the position said holder occupied in such equipment when used for such record test therein.

4. A duplex sensitized-material holder for a testing equipment for photographic flashlamp synchronization, adapted to receive at one side sensitized material for use in making a record test by dropping said holder past an exposure opening of said equipment, said sensitized material holder having at the other side a dark slide with two adjacent openings spaced lengthwise of the slide for admitting light in making a visual test in such testing equipment, said holder also having separating plates 75, 74 provided respectively with openings 80, 81 each in substantial register with the said two openings of the dark slide, and means associated with said holder for determining through which of said slide openings light is transmitted in making a visual test.

5. A duplex sensitized-material holder for a testing equipment for a photographic flashlamp synchronizer, adapted to receive at one side sensitized material for use in making a record test by dropping said holder past an exposure opening of said equipment, said sensitized material holder having at the other side a dark slide with an opening 79 for admitting light in making a visual test in such testing equipment, said holder also having separating plates 75, 74 provided respectively with aligned openings 80, 81, the said dark slide also having vertically displaced openings 82, 83, vertically displaced from and adjacent the slide opening 79, each of the openings 80, 81 being aligned with the said three openings 79, 82, 83 in said dark slide, and means associated with said holder for determining through which of said slide openings light is transmitted in making a visual test.

6. As a new article of manufacture for use in a testing equipment for photographic flashlight synchronization, a sensitized material holder adapted to be temporarily supported in said equipment and then dropped past light-admission openings in an upright wall of said equipment, said holder having at one side means for receiving sensitized material and at such side having means for receiving a dark slide for covering such sensitized material when in the holder and having at the other side a dark slide having therein at least two adjacent through-openings in substantially vertical alignment for admitting light while said holder is dropping past a light-admission opening of said equipment and the open shutter, there being means associated with said holder for determining through which of said slide openings light is transmitted in making a visual test.

7. A sensitized-material holder for use in a testing equipment for photographic flashlamp synchronization, said holder having at one side means for receiving sensitized material and at such side having means for receiving a dark slide for covering such sensitized material when in the holder and having at the other side a dark slide having therein three openings 83, 79, 82 in substantial alignment lengthwise of said dark slide and in sufficient proximity to each other to be within the area of the opening of the shutter that is being tested in the equipment, and past which shutter the holder is dropped in the equipment in such visual testing operation, said slide openings having different light-transmitting characteristics, whereby to determine through which of said slide openings light is transmitted in making a visual test.

8. A sensitized-material holder for use in a testing equipment for photographic flashlamp synchronization, said holder having at one side means for receiving sensitized material and at such side having means for receiving a dark slide for covering such sensitized material when in the holder and having at the other side a dark slide having therein at least two vertically displaced through openings that, in the dropping of said holder in the testing equipment in making a visual test, may be brought into line-of-vision register with an opening in the equipment and a registering opening of the shutter that is being tested in said equipment, said holder having two separating plates each having a through opening in register with each other and in substantial register with the through openings in the dark slide.

9. A sensitized-material holder for use in a testing equipment for photographic flashlamp synchronization, said holder having at one side means for receiving sensitized material and at such side having means for receiving a dark slide for covering such sensitized material when in the holder and having at the other side a dark slide having therein three openings 83, 79, 82 is substantial alignment lengthwise of said dark slide and in sufficient proximity to each other to be within the area of the opening of the shutter that is being tested in the equipment, and past which shutter the holder is dropped in the equipment in effecting a visual testing operation, and contrasting filters over two of said three openings.

10. A sensitized-material holder for use in a testing equipment for photographic flashlamp synchronization, said holder having at one side means for receiving sensitized material and at such side having means for receiving a dark slide for covering such sensitized material when in the holder and having at the other side a dark slide having therein upper, middle and lower openings 83, 79, 82 in substantial alignment lengthwise of said dark slide and in sufficient proximity to each other to be within the area of the opening of the shutter that is being tested in the equipment, and past which shutter the holder is dropped in the equipment in effecting a visual testing operation, and contrasting filters over the upper and lower openings 83 and 82.

11. A sensitized-material holder for use in a testing equipment for photographic flashlamp synchronization, said holder having at one side means for receiving sensitized material and at such side having means for receiving a dark slide for covering such sensitized material when in the holder and having at the other side a dark slide having therein upper, middle and lower openings 83, 79, 82 in substantial alignment lengthwise of said dark slide and in sufficient proximity to each other to be within the area of the opening of the shutter that is being tested in the equipment, and past which shutter the holder is dropped in the equipment in effecting a visual testing operation, said slide openings having different light-transmitting characteristics, whereby to determine through which of said slide openings light is transmitted in making a visual test, said holder having two separating plates each having an opening therethrough in substantial register with each other and in substantial register with said three openings 83, 79, and 82.

12. A sensitized-material holder for use in a testing equipment for photographic flashlamp synchronization, said holder having at one side means for receiving sensitized material and at such side having means for receiving a dark slide for covering such sensitized material when in the holder and having at the other side a dark slide having therein upper, middle and lower openings 83, 79, 82 in substantial alignment lengthwise of said dark slide and in sufficient proximity to each other to be within the area of the opening of the shutter that is being tested in the equipment, and past which shutter the holder is dropped in the equipment in effecting a visual testing operation, and contrasting filters over the openings 83 and 82, the middle opening 79 being an unfiltered opening.

JOSEPH A. SPRAGUE.